(12) United States Patent
Statz et al.

(10) Patent No.: US 6,777,472 B1
(45) Date of Patent: *Aug. 17, 2004

(54) HIGHLY-NEUTRALIZED ETHYLENE COPOLYMERS

(75) Inventors: Robert Joseph Statz, Kennett Square, PA (US); John Chu Chen, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/558,894

(22) Filed: Apr. 27, 2000

Related U.S. Application Data

(63) Continuation-in-part of application No. 09/422,142, filed on Oct. 21, 1999, now abandoned.
(60) Provisional application No. 60/105,065, filed on Oct. 21, 1998, provisional application No. 60/105,232, filed on Oct. 21, 1998, provisional application No. 60/105,193, filed on Oct. 22, 1998, and provisional application No. 60/105,181, filed on Oct. 22, 1998.

(51) Int. Cl.$^7$ .......................... C08K 5/09; C08K 5/098; C08L 33/02
(52) U.S. Cl. ....................... 524/322; 524/300; 524/394; 524/397; 524/400; 525/330.2
(58) Field of Search ................................ 524/300, 322, 524/394, 397, 400; 525/330.2

(56) References Cited

U.S. PATENT DOCUMENTS

| | | | |
|---|---|---|---|
| 3,384,612 A | 5/1968 | Brandt et al. .................. 260/41 |
| 3,404,134 A | * 10/1968 | Rees | |
| 3,649,578 A | * 3/1972 | Bush | |
| 4,911,451 A | 3/1990 | Sullivan et al. | |
| 5,155,157 A | 10/1992 | Statz et al. .................. 524/423 |
| 5,306,760 A | 4/1994 | Sullivan ..................... 524/400 |
| 5,312,857 A | 5/1994 | Sullivan ..................... 524/400 |
| 5,691,418 A | 11/1997 | Hagman et al. ............. 525/196 |
| 5,902,855 A | 5/1999 | Sullivan | |
| 5,973,046 A | 10/1999 | Chen et al. ................. 524/300 |

FOREIGN PATENT DOCUMENTS

| | | |
|---|---|---|
| BE | 699 171 | 11/1967 |
| EP | 0 339 743 | 11/1989 |
| GB | 2 164 342 A | 3/1986 |
| GB | 2 168 059 | 6/1986 |
| JP | 09 221581 | 8/1997 |
| JP | 10219053 | 8/1998 |
| WO | WO 92/12206 | 7/1992 |
| WO | WO 98/03565 | 1/1998 |
| WO | WO 98/46671 | 10/1998 |
| WO | WO 00 23519 | 4/2000 |

OTHER PUBLICATIONS

PCT International Search Report for International application No. PCT/US00/28822, dated Jan. 16, 2001.
PCT International Search Report for PCT/US99/24700 dated Mar. 9, 2000.
Ionomeric polyblends based on zinc salts of maleated ethylene–propylene diene monomer and maleated high density polyethylene, *Plastics Rubber and Composites Processing and Applications*, vol. 26, No. 7, pp. 311–317, 1997.

* cited by examiner

*Primary Examiner*—David J. Buttner

(57) ABSTRACT

Melt-processable, highly-neutralized ethylene, $C_3$ to $C_8$ $\alpha,\beta$ ethylenically unsaturated carboxylic acid copolymers and process for making them. Copolymers are made by incorporating a $C_4$ to less than a $C_{36}$ aliphatic, mono-functional organic acid and neutralizing greater than 90% to 100% of the acid groups present concurrently with or subsequently to the incorporation of the organic acid.

8 Claims, No Drawings

HIGHLY-NEUTRALIZED ETHYLENE COPOLYMERS

BACKGROUND OF THE INVENTION

This application is a CIP of U.S. patent application Ser. No. 09/422142 filed Oct. 21, 1999 now abandoned, which is incorporated herein by reference and which claims the benefit of U.S. Provisional patent applications Ser. No. 60/105,065 filed Oct. 21, 1998, Ser. No. 60/105,232 filed Oct. 21, 1998, Ser. No. 60/105,081 filed Oct. 22, 1998, and Ser. No. 60/105,193 filed Oct. 22, 1998.

FIELD OF THE INVENTION

The invention relates to melt-processable, highly-neutralized ethylene, $C_3$ to $C_8$ $\alpha,\beta$ ethylenically unsaturated carboxylic acid copolymers and process for making them. It relates to such copolymers, neutralized to greater than 90%, particularly to those neutralized to nearly to or to 100%. These copolymers are made by incorporating a sufficient amount of specific organic acid (or salt) into the copolymer before neutralization to the high level. These copolymers are useful in making molded products such as golf ball components, thermoplastic shoe soles for cleated footwear, and resilient foams for sporting goods.

DESCRIPTION OF RELATED ART

Ionomers of acid copolymers of alpha olefins, particularly ethylene, and $C_{3-8}$ $\alpha,\beta$ ethylenically unsaturated carboxylic acid, have been known for a long time. U.S. Pat. No. 3,264,272 (Rees) teaches methods for making such ionomers from "direct" acid copolymers. "Direct" copolymers are polymers polymerized by adding all monomers simultaneously, as distinct from a graft copolymer, where another monomer is grafted onto an existing polymer, often by a subsequent free radical reaction. A process for preparing the acid coploymer on which the ionomers are based is described in U.S. Pat. No. 4,351,931.

The acid copolymers may contain a third softening monomer such as an alkyl acrylate or methacrylate. The ethylene acid copolymers can be described as an E/X/Y copolymers where E is ethylene, X is the $\alpha,\beta$ ethylenically unsaturated carboxylic acid, particularly acylic and methacrylic acid, and Y is a softening comonomer such as a $C_1$ TO $C_8$ alkyl acrylate or methacrylate ester. X and Y can be pent in a wide range of percentages, X typically up to about 35 weight percent (wt. %) of the polymer and Y typically up to about 50 weight percent of the polymer.

The wide range of neutralization of the acid moiety in the acid copolymer by a wide range of cations is known. Typical cations include lithium, sodium, potassium, magnesium, calcium, barium, lead, tin, zinc, aluminum, and combinations of such cations. Neutralization to 90% and higher, including up to 100%, is known, but there remains a need to achieve such a high degree of neutralization without loss of melt-processability or properties such as elongation and toughness. This is particularly so for copolymers with high acid levels and when using cations other than barium, lead and tin to neutralize the copolymer.

SUMMARY OF THE INVENTION

It has been found that, by modifying an acid copolymer or ionomer with a sufficient amount of specific organic acids (or salts thereof); it is possible to highly neutralize the acid copolymer without losing processability or properties such as elongation and toughness. The organic acids employed in the present invention are aliphatic, mono-functional, saturated or unsaturated organic acids, particularly those having fewer than 36 carbon atoms.

The thermoplastic composition of this invention consists essentially of (a) aliphatic, mono-functional organic acid(s) having fewer than 36 carbon atoms; and (b) ethylene, $C_3$ to $C_8$ $\alpha,\beta$ ethylenically unsaturated carboxylic acid copolymer (s) and ionomer(s) thereof, wherein greater than 90%, preferably near 100%, and more preferably 100% of all the acid of (a) and (b) are neutralized.

With the addition of sufficient organic acid, greater than 90%, nearly 100%, and preferably 100% of the acid moieties in the acid copolymer from which the ionomer is made can be neutralized without losing the processability and properties of elongation and toughness.

The melt-processable, highly-neutralized acid copolyrner ionomer can be produced by (a) melt-blending ethylene a,d ethylenically unsaturated $C_{3-8}$ carboxylic acid copolymer(s) or ionomer(s) thereof that are not neutralized to the level that they have become intractable (not melt-processable) with one or more aliphatic, mono-functional, saturated or unsaturated organic acids having fewer than 36 carbon atoms or salts of the organic acids, and then (b) Adding a sufficient amount of a cation source to increase the level of neutralization all the acid moieties (including those in the acid copolymer and in the organic acid) to greater than 90%, preferably near 100%, more preferably to 100%.

DETAILED DESCRIPTION OF THE INVENTION

In this disclosure, the term "copolymer" is used to refer to polymers containing two or more monomers. The phrase "copolymer of various monomers" means a copolymer whose units are derived from the various monomers. "Consisting essentially of" means that the recited components are essential, while smaller amounts of other components may be present to the extent that they do not detract from the operability of the present invention. The term "(meth) acrylic acid" means methacrylic acid and/or acrylic acid. Likewise, the term "(meth) acrylate" means methacrylate and/or acrylate.

All references set forth herein are incorporated by reference.

Acid Copolymers

The acid copolymers used in the present invention to make the ionomers are preferably "direct" acid copolymers. They are preferably alpha olefin, particularly ethylene, $C_{3-8}$ $\alpha,\beta$ ethylenically unsaturated carboxylic acid, particularly acrylic and methacrylic acid, copolymers. They may optionally contain a third softening monomer. By "softening", it is meant that the polymer is made less crystalline. Suitable "softening" comonomers are monomers selected from alkyl acrylate, and alkyl methacrylate, wherein the alkyl groups have from 1–8 carbon atoms.

The ethylene acid copolymers can be described as E/X/Y copolymers where E is ethylene, X is the a,d ethylenically unsaturated carboxylic acid, and Y is a softening comonomer. X is preferably present in 3–30 (preferably 4–25, most preferably 5–20) wt. % of the polymer, and Y is preferably present in 0–30 (alternatively 3–25 or 10–23) wt. % of the polymer.

The ethylene-acid copolymers with high levels of acid (X) are difficult to prepare in continuous polymerizers because of monomer-polymer phase separation. This difficulty can be avoided however by use of "co-solvent technology" as described in U.S. Pat. No. 5,028,674 or by employing somewhat higher pressures than those at which copolymers with lower acid can be prepared.

Specific acid-copolymers include ethylene/(meth) acrylic acid copolymers. They also include ethylene/(meth) acrylic acid/n-butyl meth) acrylate, ethylene/(meth) acrylic acid/iso-butyl (meth) acrylate, ethylene/(meth) acrylic acid/methyl (meth) acrylate, and ethylene/(meth) acrylic acid/ethyl (meth) acrylate terpolymers.

Ionomer

The unmodified ionomers used in this invention are prepared from acid copolymers as described above by methods known in the art of preparing ionomrers (see Description of Related Art). They include partially neutralized acid copolymers, particularly ethylene/(meth) acrylic acid copolymers. The unmodified ionomers may be neutralized to any level that does not result in an intractable (not melt processable) polymer that does not have useful physical properties. Preferably, about 15 to about 80%, preferably about 50 to about 75% of the acid moiety of the acid copolymer is neutralized by an alkali metal or an alkaline earth metal cation.

Cations useful in making the unmodified ionomers are lithium, sodium, potassium, magnesium, calcium, or zinc, or a combination of such cations.

Organic Acids and Salts

The organic acids employed in the present invention are aliphatic, mono-functional (saturated, unsaturated, or multi-unsaturated) organic acids, particularly those having fewer than 36 carbon atoms. Also salts of these organic acids may be employed. The salts may be any of a wide variety, particularly including the barium, lithium, sodium, zinc, bismuth, potassium, strontium, magnesium or calcium salts of the organic acids.

While it may be useful for the organic acids (and salts) to have a low volatility when being melt-blended with acid copolymer or ionomer, volatility has been found to not be limiting when neutralizing the blend to high levels, particularly near to or at 100%. At 100% neutralization (all acid in copolymer and organic acid neutralized), volatility simply is no longer an issue. As such, organic acids with lower carbon content can be used. Particularly useful organic acids include $C_4$ to less than $C_{36}$ (say $C_{34}$), $C_8$ to $C_{26}$, particularly $C_8$ to $C_{18}$, particularly $C_8$ to $C_{12}$, organic acids. Particular organic acids useful in the present invention include caproic acid, caprylic acid, capric acid, lauric acid, stearic acid, behenic acid, erucic acid, oleic acid, and linoelic acid.

Process for Making Highly-Neutralized Ionomer

The melt-processable, highly-neutralized acid copolymer ionomer of the present invention can be produced by (a) melt-blending ethylene $\alpha,\beta$ ethylenically unsaturated $C_{3-8}$ carboxylic acid copolymer(s) or ionomer(s) thereof that are not neutralized to the level that they have become intractable (not melt-processable) with one or more aliphatic, mono-functional, saturated or unsaturated organic acids having less than 36 carbon atoms or salts of the organic acids, and concurrently of subsequently (b) Adding a sufficient amount of a cation source to increase the level of neutralization all the acid moieties (including those in the acid copolymer and in the organic a greater than 90%, preferably near 100%, more preferably to 100%.

Neutralization of acid copolymers and organic acids in this manner (concurrently or subsequently) has been found to be the only way without the use of an inert diluent to neutralize the copolymer without loss of processability or properties such as toughness and elongation to a level higher than that which would result in loss of melt processability and properties for the ionomer alone. For example, an acid copolymer can be neutralized to over 90%, preferably to about 100% or to 100% neutralization without losing the melt processability associated with acid copolymers neutralized to greater than 90%. In addition, neutralizing to about 100% or to 100% reduces the deposits of the organic acids on the mold vent observed upon molding mixtures with less than 100% neutralization.

The acid copolymer(s) or unmodified ionomer(s) can be melt-blended with the organic acid(s) or salt(s) is any manner known in the art. For example, a salt and pepper blend of the components can be made and the components can then be melt-blended in an extruder.

The still melt-processable, acid-copolymer/organic-acid-or-salt blend can be neutralized or further neutralized by methods known in the art. For example, a Wemer & Pfleiderer twin screw extruder can be used to neutralize the acid copolymer and the organic acid at the same time.

Depending on the acid level of the co- or ter-polymer, the level of organic acid that controls processablity can be determine based on the disclosures herein. The percent organic acid needs to be higher for higher acid levels in the backbone of co- or terpolymer. See, for example the following table comparing melt indices obtained for various acid levels in an E/14-16%nBA/AA terpolymer. Less of a lower molecular weight organic acid is needed to have the same effect as a higher amount of a higher molecular weight organic acid.

TABLE 1

Comparing M.I. To Stearic Acid I. vel and % AA

| Acid Level | M.I. Base Resin | Stearic Acid Level | | | | |
|---|---|---|---|---|---|---|
| | | 20% | 30% | 35% | 40% | 45% |
| 8.1% AA | 67.9 | | | 1.8 | 2 | 6 |
| About 8.3% AA | 62.5 | | | 1.08 | 1.13 | 2.25 |
| 10.1% AA | 66.8 | | | 0.62 | 1.55 | 2.22 |
| About 6.8% AA | 75 | 1.25 | 1.92 | | 6.52 | |
| About 4.9% AA | 86 | 4.9 | 9.7 | | 23.2 | |

Highly-Neutralized, Melt-Processable Ionomer

The resulting thermoplastic composition of this invention consists essentially of (a) aliphatic, mono-functional organic acid(s) having fewer than 36 carbon atoms; and (b) ethylene, $C_3$ to $C_8$ $\alpha,\beta$ ethylenically unsaturated carboxylic acid copolymer(s) and ionomer(s) thereof, wherein greater than 90%, preferably near 100%, and more preferably 100% of all the acid of (a) and (b) are neutralized.

This resulting highly neutralized; melt-processable acid copolymer of this invention can be melt-blended with other components to produce end products. For example, it may be melt-blended with components employed in co-pending U.S. application Ser. No. 09/422,142, to make one-, two-, three-piece, and multi-layered golf balls and foamed materials useful in footwear and other sport balls such as softballs. The components used with the resulting highly neutralized, melt-processable acid copolymer in this case include thermoplastic polymer components selected from copolyetheresters, copolyetheramides, elastomeric polyolefins, styrene diene block copolymers and thermoplastic polyurethanes; and fillers.

Testing Criteria for Examples

Coefficient of Restitution (COR) is measured by firing an injection-molded neat sphere of the resin having the size of a golf ball from an air cannon at a velocity determined by the air pressure. The initial velocity generally employed is 125 feet/second. The ball strikes a steel plate positioned three feet away from the point where initial velocity is determined, and rebounds through a speed-monitoring device. The return velocity divided by the initial velocity is the COR.

PGA Compression is defined as the resistance to deformation of a golf ball, measured using an Atti machine.

Tensile properties (tensile at break, elongation at break, tensile yield, and elongation yield) are determined in accord with ASTM D1708.

EXAMPLES

Numbers in parentheses in the tables represent the weight percentage of the component in the blend.

Employing a Werner & Pfleiderer twin screw extruder, 4812 grams of stearic acid were added to 7218 grams of an E/23nBA/9.6MAA polymer. Enough magnesium hydroxide was added to this mixture to air neutralize 90% and more than 95% of the available acid. (See Ex 1a & 1b in Table 1).

Two other resins with the composition cited in Table 2 were reacted with stearic acid and magnesium hydroxide. However, in this case, enough magnesium hydroxide was added to neutralize 100% of the available combined acids. These mixed anionic ionomers Ex 1c and 1d are listed in Table 2.

TABLE 2

Magnesium Stearate Modified Magnesium Ionomers

| Ex No | Resin Comp. | Cation Type | Organic Acid (%) | % Neut | M.I. (g/10 min) |
|---|---|---|---|---|---|
| 1a | E/23nBA/9.6MAA | Mg | Stearic(40) | 90 | 5.2 |
| 1b | E/23nBA/9.6MAA | Mg | Stearic(40) | 95 | 3.6 |
| 1c | E/15nBA/8.5AA | Mg | Stearic(40) | >100 | 1.15 |
| 1d | E/16nBA/12AA | Mg | Stearic(40) | >100 | 0.09 |

Properties of the 100% neutralized resin of Example 1c are set forth in the following Table 3.

TABLE 3

| PGA Comp | COR | Tensile at Break (psi) | Tensile Yield (psi) | Elongation at Break (%) | Elongation Yield (%) |
|---|---|---|---|---|---|
| 90 | 787 | 2802 | 2069 | 340 | 28 |

What is claimed is:

1. A thermoplastic composition that is melt-processable consisting essentially of (a) from 20 to 45 weight percent aliphatic, mono-functional organic acid(s) having fewer than 36 carbon atoms or salt(s) thereof; and (b) ethylene, $C_3$ to $C_8$ α,β ethylenically unsaturated carboxylic acid copolymer(s) or melt-processible ionomer(s) thereof, wherein greater than 90% of all the acid of (a) and (b) is neutralized by concurrently or subsequently adding to the melt blend of (a) and (b) an amount of a cation source necessary to obtain the greater than 90% neutralization.

2. The composition of claim 1 wherein about 100% of the acid in (a) and (b) is neutralized.

3. The composition of claim 1 wherein an amount of cation source in excess of the amount required to neutralize 100% of the acid in (a) and (b) is used to neutralize the acid in (a) and (b).

4. The composition of claim 1 wherein the organic acid is one or more $C_6$ to $C_{26}$ organic acids.

5. The composition of claim 4 wherein the organic acid is one or more $C_6$ to $C_{18}$ organic acids.

6. The composition of claim 5 wherein the organic acid is one or more of $C_6$ to $C_{12}$ organic acids, 7. A process to make a highly-neutralized, melt-processable ethylene copolymer comprising the steps of
   (a) Melt-blending an ethylene ad ethylenically unsaturated carboxylic acid copolymer or a melt-processable ionomer thereof with an organic acid or a salt of organic acid, and
   (b) Concurrently or subsequently adding cation source in an amount in excess of the amount necessary to neutralize about 100% of all the acid moieties of the acid copolymer or ionomer thereof and the organic acid or salt thereof.

8. A thermoplastic melt processable composition formed according to the process of claim 7, wherein said organic acid or salt of an organic acid is present at 20 to 45 weight percent.

\* \* \* \* \*

UNITED STATES PATENT AND TRADEMARK OFFICE
CERTIFICATE OF CORRECTION

PATENT NO. : 6,777,472 B1
DATED : August 17, 2004
INVENTOR(S) : Statz Robert Joseph and Chen John Chu It is certified that error appears in the above-identified patent and that said Letters Patent is hereby corrected as shown below:

<u>Column 6,</u>
Line 36, delete "ad", replace with -- $\alpha,\beta$ --.

Signed and Sealed this

Twenty-ninth Day of November, 2005

JON W. DUDAS
*Director of the United States Patent and Trademark Office*